United States Patent [19]
Nowak et al.

[11] Patent Number: 5,797,802
[45] Date of Patent: Aug. 25, 1998

[54] DIE HEAD

[75] Inventors: Florian I. Nowak; Gary F. Nowak; Glen L. Nowak, all of Newington, Conn.

[73] Assignee: Nowak Products, Inc., Newington, Conn.

[21] Appl. No.: 855,800

[22] Filed: May 12, 1997

[51] Int. Cl.$^6$ ............................................. B21J 13/02
[52] U.S. Cl. ............................. 470/185; 470/190; 470/80
[58] Field of Search ........................... 470/183, 185, 470/186, 187, 188, 190, 57, 58, 66, 73, 74, 75, 80, 81, 82, 83; 408/153, 154, 161

[56] References Cited

U.S. PATENT DOCUMENTS

| | | | |
|---|---|---|---|
| 1,639,719 | 8/1927 | Breitenstein . | |
| 2,195,837 | 4/1940 | Breitenstein | 470/188 |
| 2,387,291 | 10/1945 | Powell et al. | 470/82 |
| 2,556,742 | 6/1951 | Strickland | 470/188 |
| 3,864,774 | 2/1975 | Fohl | 470/66 |
| 5,199,928 | 4/1993 | Gress et al. | 470/75 |

Primary Examiner—Lowell A. Larson
Assistant Examiner—Ed Tolan
Attorney, Agent, or Firm—Ira S. Dorman

[57] ABSTRACT

A fast-acting die head that is particularly well-suited for use with small-size workpieces employs a set of chasers, each formed as a single piece and having a nose portion that provides two force-receiving surface elements. One of the surface elements is disposed to coact with a camming ring, which is moved axially thereover to close the chasers radially upon the workpiece; the other, underlying surface element receives the force of a spring-loaded plunger, which acts to thrust the associated chaser to an open position when the closing force of the camming ring is removed.

12 Claims, 6 Drawing Sheets

DIE HEAD

BACKGROUND OF THE INVENTION

Automatic screw machines typically employ die heads that are tripped and reset, at the completion and commencement of each cutting operation, by camming arrangements. They also typically employ a lead screw for advancing the die head at a pitch that corresponds the thread being cut. These features tend to make conventional screw machines relatively expensive to manufacture and inconvenient to employ, while at the same time affording levels of precision that are inadequate for certain applications. In particular, automatic screw machines having such features are not well adapted for ultra-precision cutting operations, subject to tight tolerances, nor are they generally suitable for use with small or miniature workpieces.

A self-opening die head is described in Breitenstein U.S. Pat. No. 1,639,719, which employs chasers that are provided with pins upon which spring-actuated plungers bear to urge the chasers to radially outward positions. As a practical matter, such a construction is feasible only where the dimensions of the chasers (and consequently of the die head) are sufficiently large to permit ready assembly and to afford adequate structural strength to the parts. The Breitenstein construction also limits the length of the bevelled camming surface that is presented on the chaser, in turn limiting the capacity of the die head to accommodate a wide range of workpiece sizes.

SUMMARY OF THE INVENTION

Accordingly, it is a broad object of the present invention to provide a fast-acting die head and, more particularly, such a die head that is adapted for use with small size workpieces.

It is also a broad object of the invention to provide a thread-cutting system that incorporates a die head having the foregoing features.

Additional objects of the invention are to provide such a die head and system which are highly effective in operation, and which are, in addition, relatively facile, incomplex, and inexpensive to use and produce.

Another object of the invention is to provide a chaser that is particularly adapted for use in a die head of the character described.

It has now been found that certain of the foregoing and related objects of the invention are attained by the provision of a fast-acting die head, constructed for engagement of a workpiece on an axis thereof, comprising: a body, a plurality of chasers, biasing means, and operating means. The chasers are assembled with the body for movement, in effective opposition to one another, between open and closed positions in which they are disposed, respectively, relatively close to and relatively distant from the axis. The biasing means is operatively interposed between the die head body and the chasers for resiliently biasing the chasers toward either the closed or (in most embodiments) the open position, and the operating means comprises an operating member that is reciprocally movable, relative to the body, along the axis of the die head. At least one camming surface is provided on the operating member for engagement with the chasers, to force them (against the biasing means) toward the open or the closed position (as the case may be) during movement of the operating member in the "one" direction. Each chaser comprises a workpiece-engaging portion and at least two force-receiving elements, one such element being a bearing surface, for engagement by the biasing means, and the other element being a cam-follower surface disposed for engagement by the camming surface of the operating member.

More particularly, each chaser comprises an elongate member having opposite end portions, one of which portions provides the workpiece-engaging portion and the other of which provides the force-receiving elements. The "other" end portion has forward and rearward lengthwise margins, and terminates in a forwardly inclined outer surface, constituting the cam-follower surface. A nose element projects beyond the rearward margin of the chaser body and provides both the bearing surface against which the biasing means acts, and also a portion of the cam-follower surface. The bearing surface and the cam-follower surface portion are axially aligned, along an axis parallel to the longitudinal axis of the chaser member, and in most embodiments the bearing surface will be in an underlying relationship to the cam-follower surface portion.

The body of the die head will usually be so constructed as to receive a workpiece inserted at least partially into it, with the chasers being disposed relatively close to the die head axis in their closed position. The chasers will generally move in planes that include the die head axis, as well as in planes to which the axis is normal; most often, the chasers will move in a translational manner. The workpiece engaging portion of each of chaser will, in most instances, comprise a thread-cutting element.

Other objects of the invention are attained by the provision of a thread-cutting system, which includes a fast-acting die head, as herein described, in combination with actuation means. In such a system, the workpiece-engaging portion of each chaser comprises thread-cutting means, and the die head operating means includes an actuating member that is reciprocally movable, relative to the operating member, and is constructed for operative engagement to move the operating member in the "one" direction as well as for independent movement in the opposite direction. The actuating means of the system comprises: an engagement component, the actuating member of the die head, a supporting component on which the engagement component is mounted, and limiting means. The supporting component is movable relative to the die head and is so constructed as to advance the die head to a position of initial engagement with a workpiece, acting through the engagement component and the actuating member; the structure of the supporting component also permits free movement of the engagement component beyond the position of initial engagement. The limiting means is so disposed as to engage the engagement component, at a point beyond its position of initial engagement, so as to thereby limit the distance that the engagement component can travel.

In operation, the supporting component of the system is moved relative to the die head so as to advance the latter to a position of initial engagement with the workpiece. The die head and the engagement component advance together, as the thread is being cut, until they reach the point at which the engagement component engages the limiting means. Continued advancement of the components of the die head (separately from the actuating member) causes the operating member to disengage from the chasers, thereby permitting the biasing means to bias the chasers toward their open or closed positions (again, as the case may be).

DETAILED DESCRIPTION OF THE PREFERRED AND ILLUSTRATED EMBODIMENT

Figure 3:
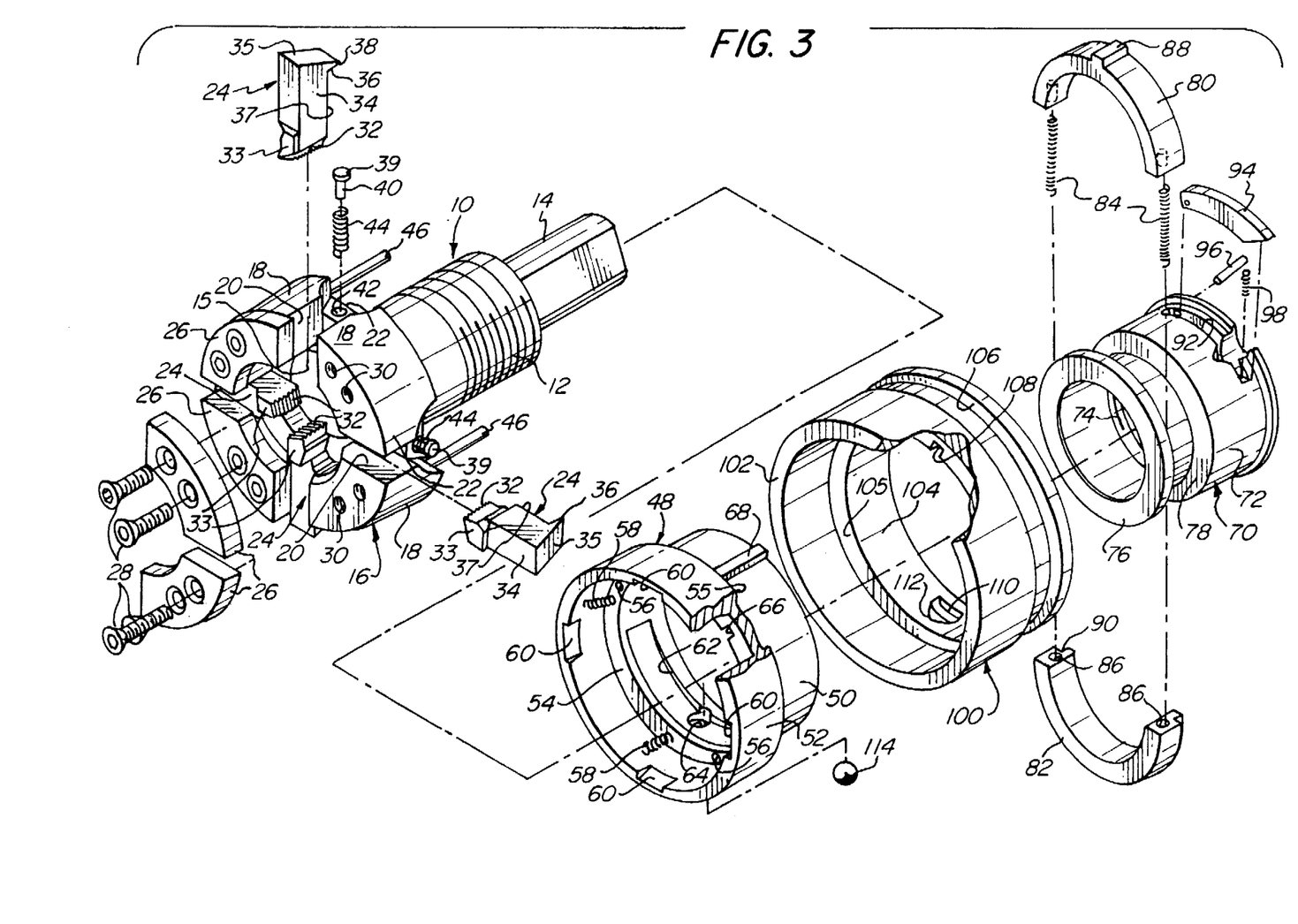
FIG. 3 is an exploded isometric view, in partial section, showing components of the die head.
Figure 11:
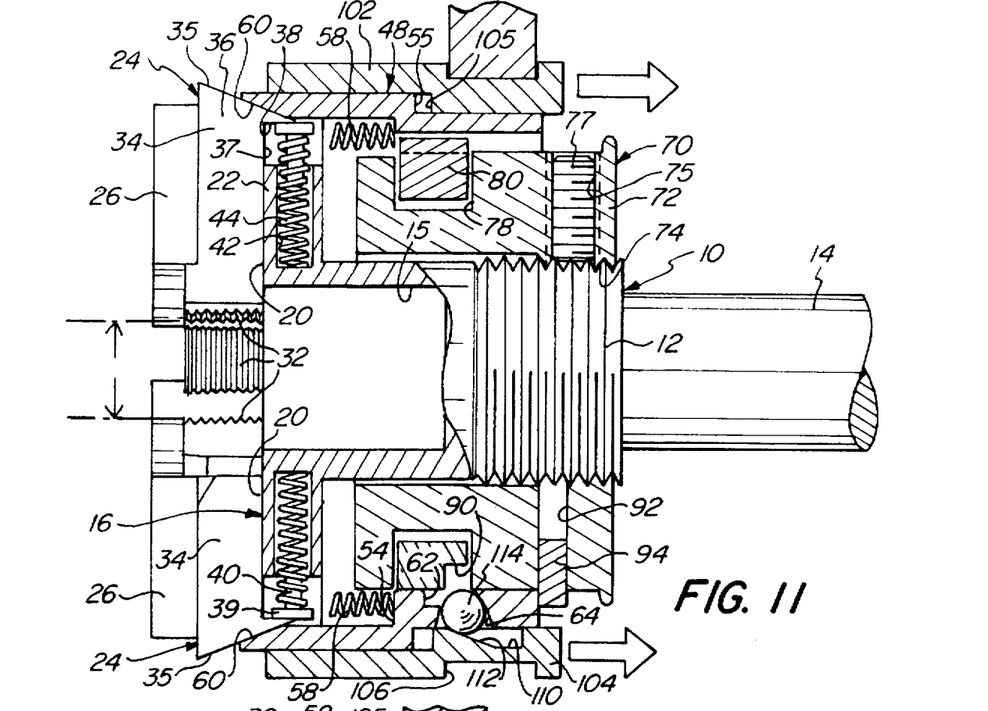
FIG. 11 is a fragmentary sectional view of the die head, drawn to an enlarged scale and showing the cutting dies (chasers) in their open positions.
Figure 12:
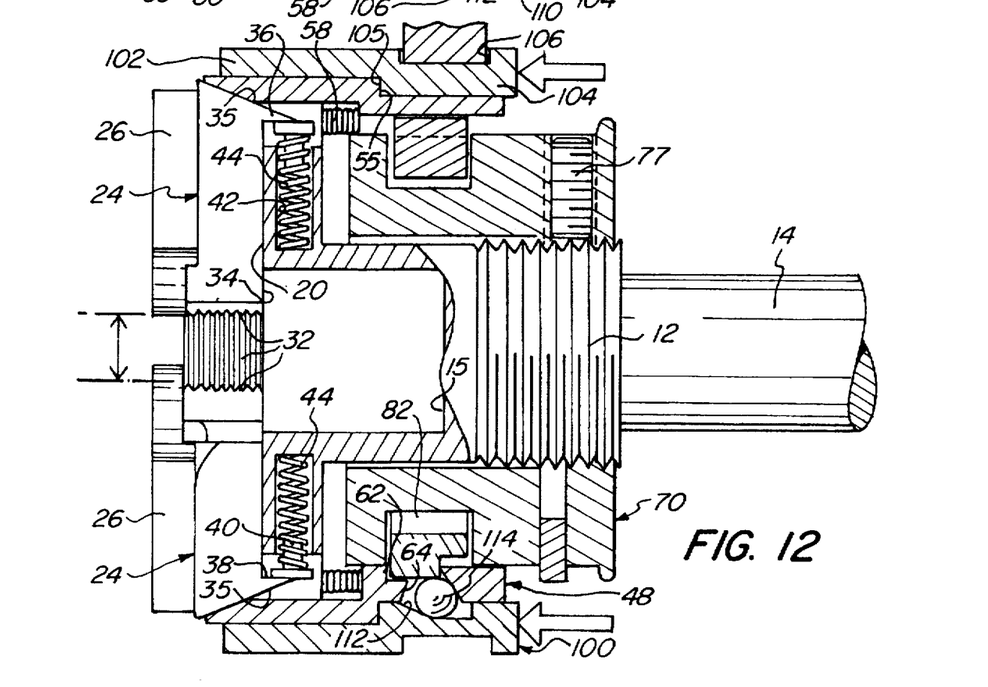
FIG. 12 is a view similar to FIG. 11, showing the dies in closed positions for cutting threads in a workpiece (not shown).

Turning now in detail to the appended drawings, therein illustrated is a thread-cutting system that incorporates a fast-acting die head, which in turn incorporates a unique chaser, all embodying the present invention. As best seen in FIGS. 3, 11, and 12, the die head consists of a cylindrical body, generally designated by the numeral 10, having a forwardly opening cavity 15 and a threaded rearward end portion 12, from which threaded portion projects a shaft 14. Head structure, generally designated by the numeral 16, is disposed forwardly on the body 10 and consists of four sectors 18 spaced circumferentially by intervening radial slots 20 (of constant width), the inner ends of the slots 20 being defined by connecting web elements 22.

Four chasers, each generally designated by the numeral 24, are slidably seated within the slots 20 and against the web elements 22. They are retained by four annulus sections 26, which are secured against the end surfaces of the head sectors 18 by set screws 28 engaged in threaded apertures 30. It will be noted that the annulus sections are of such arcuate length as to project beyond only one side margin of each slot 20, thereby serving to prevent inadvertent forward release of the chasers 24 while, at the same time, permitting a full range of radial movement.

Each chaser 24 has a thread-cutting element 32 on a head portion 33 thereof, formed at one end of the integral body portion 34. An integral nose element 36 projects beyond the rearward, lengthwise margin 37 of the body 34; it provides a portion of the inclined outer bearing surface 35, as well as an underlying bearing surface 38 extending at a right angle to the margin 37. A plunger 40, and associated coil spring 44, are mounted in a blind aperture 42 that extends radially into each web element 22, and the nose element 36 of the adjacent chaser 24 projects over the web element 22 for contact by the head 39 of the corresponding plunger 40. A pair of parallel mounting rods 46 extend rearwardly from the head portion 16 at diametrically opposed positions and in an axial direction.

Figures 6, 6A:
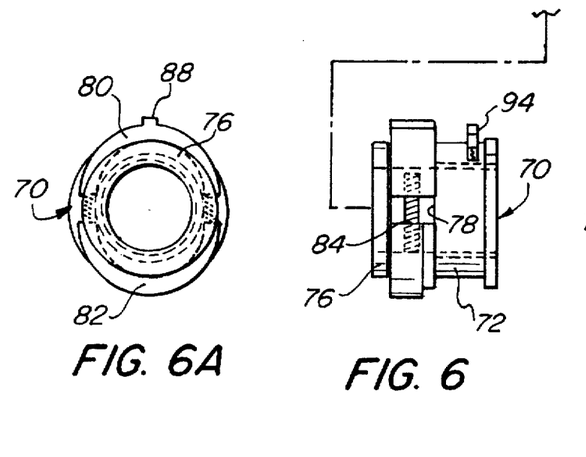
FIGS. 6, 6a and 6b are similar views of the mounting collar of the die head.
Figure 6B:
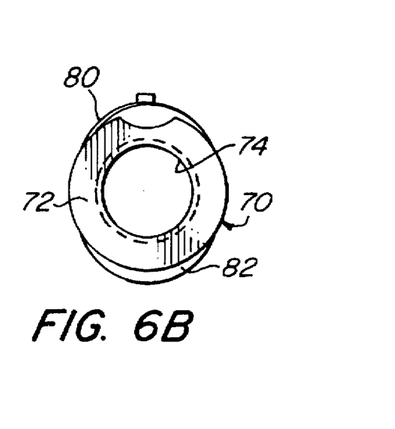
Figure 7:
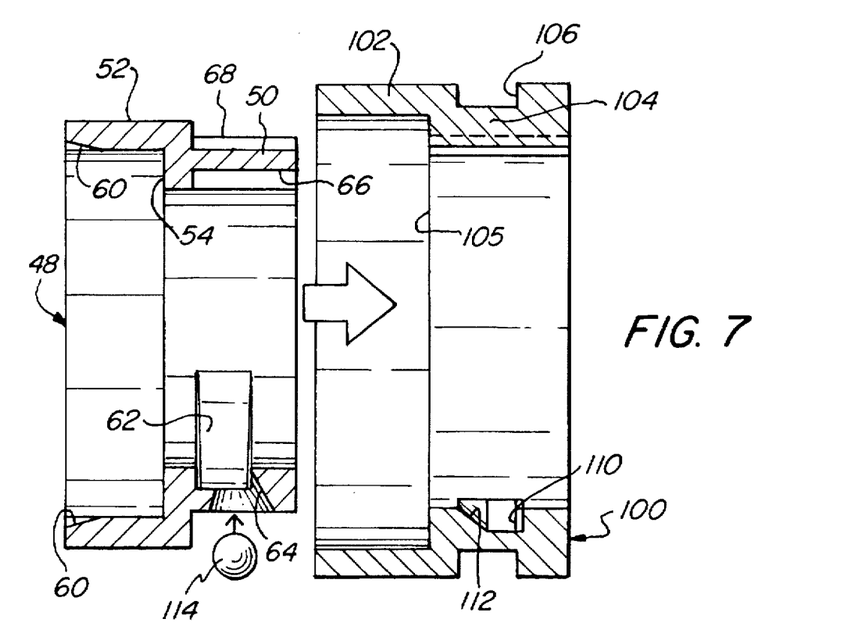
FIG. 7 is an exploded sectional view depicting assembly of the camming ring and actuating collar.
Figure 8:
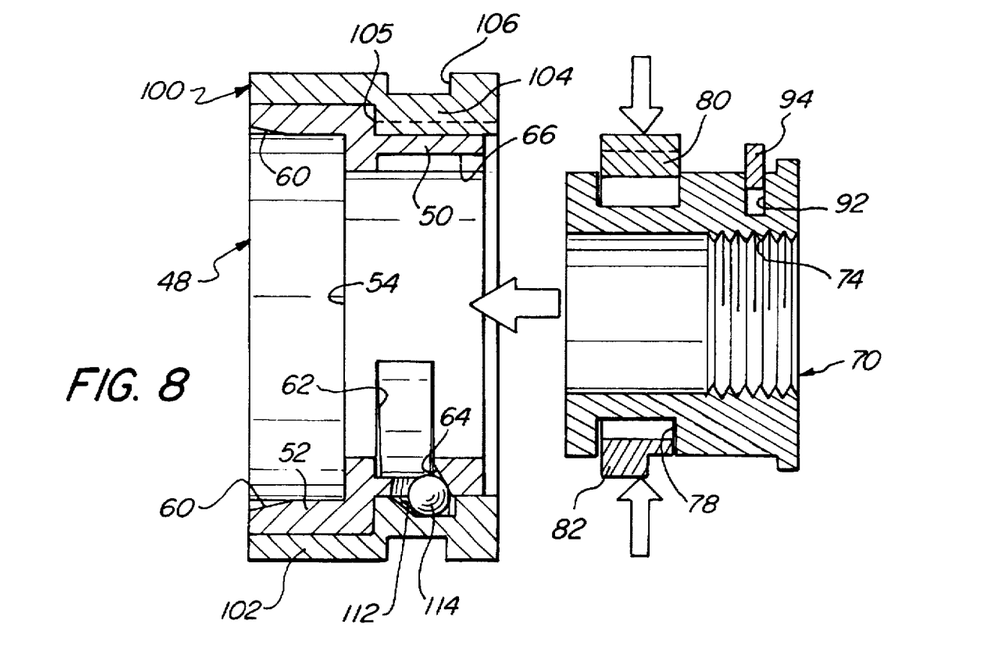
FIG. 8 is a sectional view showing assembly of the mounting collar and the locking ring segments with the camming ring/actuating collar subassembly.
Figure 9:
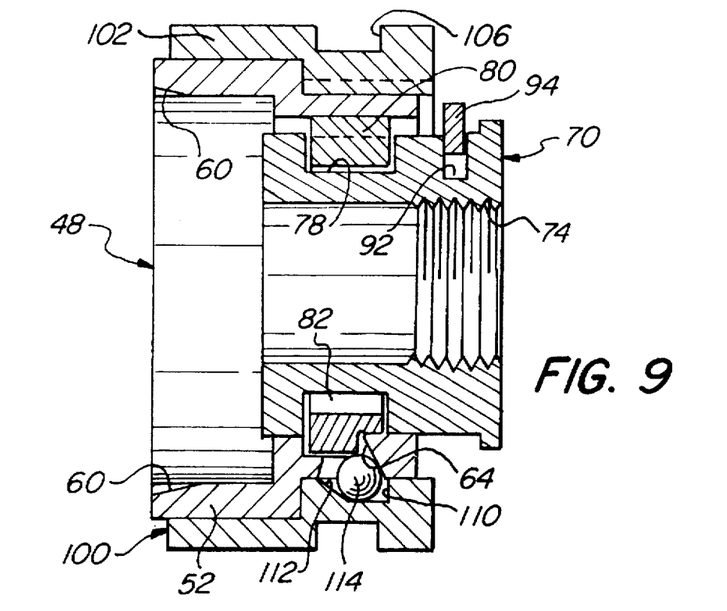
FIG. 9 is a sectional view showing the components depicted in FIG. 8 in assembled relationship, and showing the camming ring and mounting collar locked against relative axial movement by the ring segments.
Figure 10:
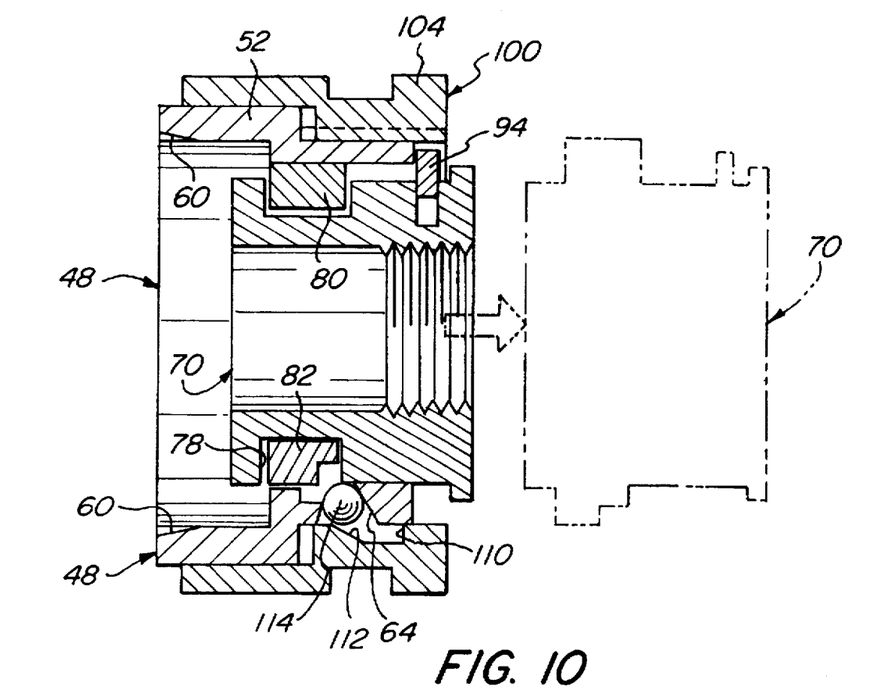
FIG. 10 is a similar view showing disengagement of the mounting collar from the camming ring/actuating collar subassembly.

A mounting collar, generally designated by the numeral 70, consists of an inner cylindrical portion 72, which is internally threaded at 74, and an outer annular portion 76, between which portions 72, 76 is defined a circumferential channel 78. The threaded portion 74 of the collar 70 engages the threaded portion 12 of the cylindrical body 10 to establish a desired relative axial position, which position is secured by tightening the set screw 77, received in the threaded radial aperture 75, against the portion 12. It will be appreciated that the axial position of collar 70 determines the diameter of the thread that is cut by the chasers 24 in operation of the cutting head. A secantal slot 92 is formed adjacent the inner end of the cylindrical portion 72 of the collar 70, and serves to seat a locking pawl 94, the pawl 94 being pivotably mounted in the slot 92 on pin 96 and being biased outwardly by coil spring 98.

Upper and lower semicircular ring segments 80 and 82, respectively, are seated in the circumferential channel 78 of the mounting collar 70, the upper segment 80 having an axial key 88 on its outer surface. The two segments are biased apart by springs 84, the opposite ends of which are received in small holes 86 formed into the confronting end surfaces of the segments.

Figures 4, 4B:
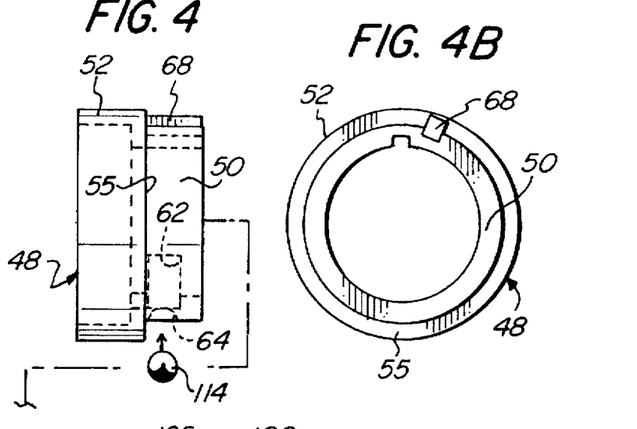
FIGS. 4, 4a, and 4b are, respectively, side elevational, front and rear views of the camming ring employed in the die head.
Figure 4A:
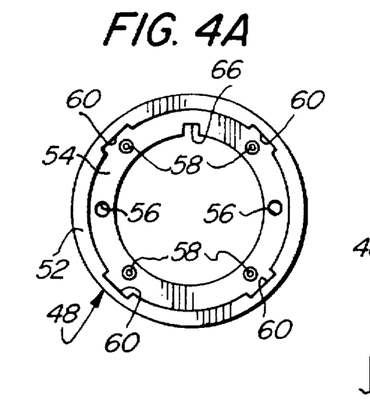

A camming ring, generally designated by the numeral 48, is coaxially mounted for slidable axial movement relative to the mounting collar 70. The ring 48 consists of an inner cylindrical portion 50 and an outer cylindrical portion 52, which intersect to form an internal annular shoulder 54 and an external annular shoulder 55 therebetween. Apertures 56 extend axially into the internal shoulder 54, and serve to receive the parallel mounting rods 46 on the head portion 16, thereby permitting non-rotatable, relative axial movement therebetween. Four inclined camming surfaces 60 are formed into the inside surface of the lip of the outer cylindrical portion 52 of the camming ring 48, at equiangularly spaced circumferential locations. The surfaces 60 are dimensioned and oriented to slidably engage the inclined bearing surfaces 35 of the chasers 24, to thereby exert a inward radial closing force upon all four chasers simultaneously when the camming ring 48 is moved in a forward, axial direction thereover.

Rearward movement of the ring 48, relative to the collar 70, is limited by the extended locking pawl 94. Depressing the pawl 94 permits the ring 48 to be displaced rearwardly to a clearance position in which the chasers 24, and the associated biasing elements, can be removed from the head.

A semicircular groove 62 is formed into the interior surface of the inner cylindrical portion 50 of the ring 48, eccentrically to the longitudinal axis (center line) of the die head, and a small aperture 64 extends through the portion 50 in communication with the groove 62. An axial keyway 66 is also formed into the interior surface of the cylindrical portion 50, which engages the key 88 on the upper semicircular ring segment 80, and an axial key 68 is formed on the exterior surface. (It is to be noted that the keyway 66 is shown displaced slightly from its correct position, which is diametric to the aperture 64; this was done for clarity and ease of illustration).

Figures 5, 5A, 5B:
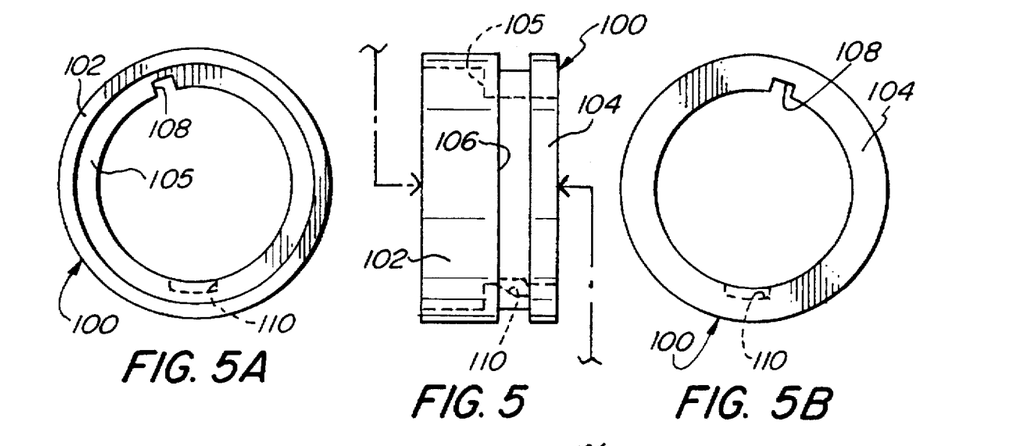
FIGS. 5, 5a and 5b are similar views of the actuating collar employed in the die head.

The operating collar, generally designated by the numeral 100, comprises a forward cylindrical portion 102 and a rearward cylindrical portion 104, between which is formed an internal annular shoulder 105. A circumferential channel 106 extends about the rearward cylindrical portion 104, and an axially extending keyway is provided in the internal surface of the portion 104; the keyway 108 engages the key 68 on the camming ring 48. A small recess 110 is formed into the interior surface of the rearward cylindrical portion 104, the forward edge of which is relieved to provide a ramp surface 112. The recess 110 serves to receive an operating ball 114, the function of which will be described presently.

Figure 1:
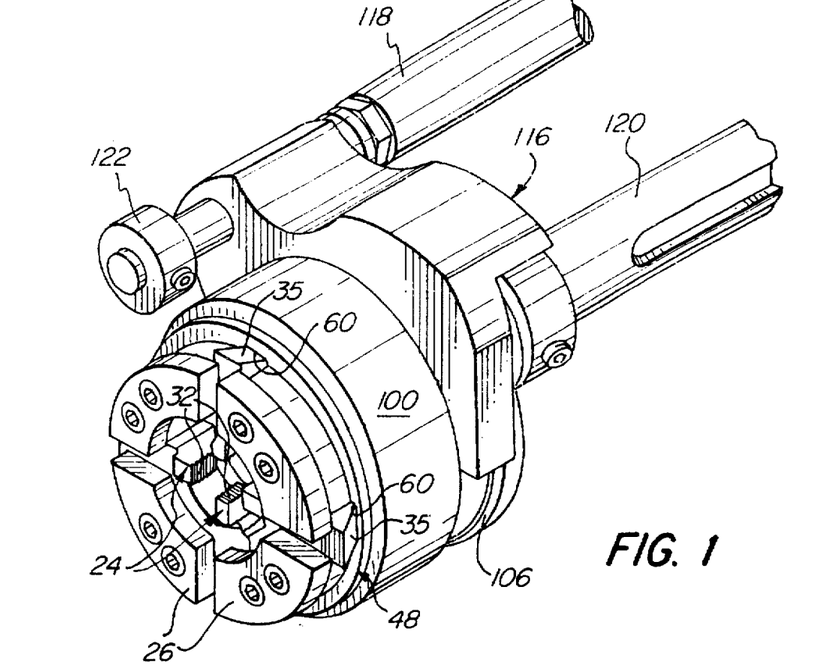
FIG. 1 is a fragmentary isometric view of a thread-cutting system embodying the present invention.
Figure 2:
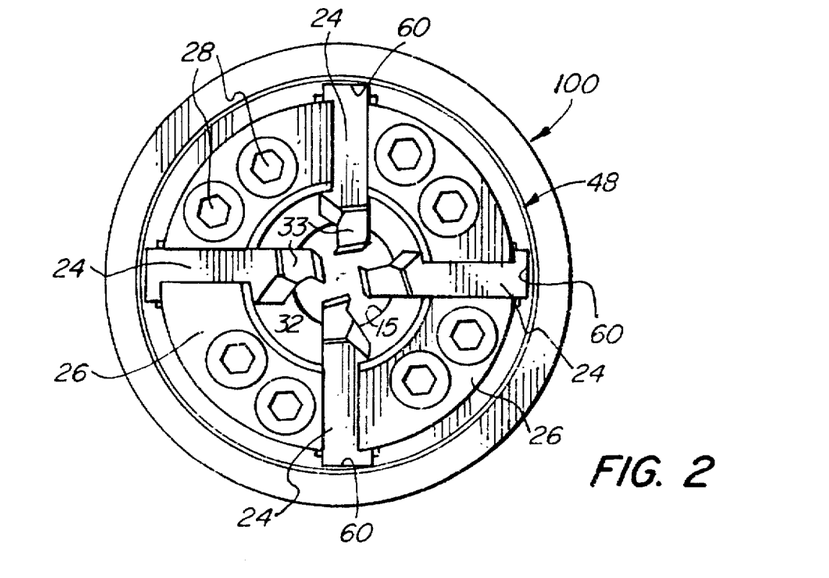
FIG. 2 is a forward end elevational view of the die head utilized in the thread-cutting system, also embodying the present invention.

As depicted in FIGS. 1, 2 and 11 of the drawings, the die head is in its open configuration and the yoke by which it is operated, generally designated by the numeral 116 (and seen only in FIG. 1), is in a retracted position on the rod 118. Movement of the rod 118 to shift the yoke 116 slightly forwardly (i.e., to the left in FIG. 1) will permit the ball 114 to drop into the recess 110 of the operating collar 100, and will also cause the external shoulder 105 on the collar 100 to engage the shoulder 55 on the camming ring 48, thereby moving the latter forwardly against the force of the springs 58. Such movement will in turn cause the camming ring 48 to urge the chasers 24 radially inwardly, with the camming surfaces 60 acting upon the bearing surfaces 35, ultimately to attain the closed configuration depicted in FIG. 12.

As can be seen, in the closed position the spacing x' between the diametrically opposed points of contact on the cutting elements 32 is substantially less than the corresponding distance x between the elements 32 in the open configuration of FIG. 11. As can also be seen, in the closed configuration the lower semicircular ring section 82 is engaged within the semicircular eccentric groove 62 of the camming ring 48, coupling the ring 48 and the mounting collar 70 against relative axial movement and thereby maintaining the chasers 24 in their closed positions. Although not illustrated, it will readily be appreciated that the cutting elements 32 engage the surface of a workpiece (a length of screw stock, received axially therebetween) so as to cut a thread therein as the die head 16 is rotated by the spindle 120 (attached to the shaft 14) and as the workpiece proceeds into the recess 15 of the head.

With continued cutting of the thread, the entire die head, and the operating collar 100 (being locked in axially fixed positions relative to one another), are drawn forwardly. When the yoke 116 encounters the collar 122 affixed on the end of the rod 118 (the position of which is adjusted to vary the thread length), forward movement of the yoke 116, and consequently of the collar 100, is arrested. As the coupled die head and camming ring continue to advance, contact against the trailing edge of the hole 64 urges the ball 114 up the ramp surface 112 and more deeply into the hole 64, ultimately to protrude slightly and into contact against the surface of the lower ring segment 82. This will in turn force the ring segment 82 out of the slot 62, thereby decoupling the camming ring 48 from its axially affixed position on the mounting collar 70 and permitting the compressed springs 58 to thrust the camming ring rearwardly (i.e., to the right in FIG. 12). The spring-driven plungers 40 will simultaneously thrust the chasers 24 radially outwardly, causing the die head to quickly resume the configuration and position depicted in FIGS. 1 and 11.

Although the foregoing description and the appended drawings are directed to a die head for cutting threads, it will be appreciated that the die head of the invention may take other forms. For example, rather than closing upon a workpiece inserted between the chasers the die head can function with the chasers moving outwardly into engagement with a surrounding workpiece surface.

The chasers will of course be so constructed as to render them most suitable for a particular purpose that the die head is intended to serve, but in any event they will preferably (if not necessarily) be integrally formed as a single piece (i.e., they will each be of unitary construction), and normally they will be machined from tool steel. Merely by way of illustration, and not limitation, a typical chaser will measure about ½ inch in length (i.e., in the radial dimension of the installed piece), about ⅛ inch in width, and about 7/32 inch in depth (i.e., from front to back), of which depth about ⅔2 inch comprises the nose element; thus, it will be appreciated that the chasers may be made in very small sizes.

The rearwardly projecting nose element is an especially important feature of the chaser. Not only does it provide the two required force-receiving surfaces in optimal positions, on an element that is structurally strong and readily fabricated (even in small dimensions), but since the nose element also provides a portion of the cam follower surface it permits that surface to be longer that it would otherwise be. This extends the range of workpiece sizes that are accommodated by the die head, as compared to prior art chasers in which the ends of the camming surface do not extend beyond the front and rear margins of the chaser body (see for example the bevel shown at 17 in FIG. 4 of the above-identified Breitenstein patent).

Thus, it can be seen that the present invention provides a novel fast-acting die head, and a novel thread-cutting system that incorporates the same, which are highly effective in operation and are particularly adapted for construction and use for machining small-size workpieces. The advantages realized are attributable in large part to the unique, one-piece chasers that are employed in the die head; utilization and manufacture of the described system and components are relatively facile, incomplex, and inexpensive.

Having thus described the invention, what is claimed is:

1. A fast-acting die head constructed for engagement of a workpiece on an axis thereof, said die head comprising a body; a plurality of chasers assembled with said body for movement, in effective opposition to one another, between open and closed positions in which said chasers are disposed relatively close to, and relatively distant from, said axis, respectively; biasing means operatively interposed between said body and said chasers for resiliently biasing said chasers toward one of said open and closed positions; and operating means assembled with said body and comprising a camming member reciprocally movable relative to said body along said axis, said camming member having at least one camming surface thereon for engagement with said chasers to force said chasers toward the other of said open and closed positions during movement of said camming member in one direction; each of said chasers having a workpiece-engaging portion and at least two force-receiving elements, one of said force-receiving elements being a bearing surface for engagement by said biasing means to bias said chaser toward said one position, and the other of said force-receiving elements being a cam-follower surface disposed for engagement by said camming surface of said camming member to force said chaser toward said other position, each of said chasers comprising an elongate member having a longitudinal axis and opposite end portions thereon, one of said end portions comprising said workpiece-engaging portion and the other of said end portions providing said at least two force-receiving elements, said elongate member having forward and rearward lengthwise margins and terminating at said other end portion in a forwardly inclined surface which provides a first portion of said cam-follower surface, said other end portion including a nose element that projects beyond said rearward margin and defines both said bearing surface and also a second portion of said cam-follower surface contiguous to said first portion thereof, said bearing surface and said second portion of said cam-follower surface being aligned generally on an axis parallel to said longitudinal axis of said elongate member.

2. The die head of claim 1 wherein said body is constructed to receive a workpiece inserted at least partially thereinto, said chasers being disposed relatively close to said axis in said closed positions thereof, said cam-follower surface being an outer surface of said chaser member, and said bearing surface being an underlying surface on said nose element.

3. The die head of claim 1 wherein, in moving in effective opposition to one another, said chasers move in planes that include said axis of said die head.

4. The die head of claim 3 wherein movement of said chasers is translational.

5. The die head of claim 4 wherein said chasers move, and said biasing means acts, in planes to which said die head axis is normal, and wherein said at least one camming surface of said camming member, and said cam-follower surfaces of said chasers, lie generally oblique to said planes to which said axis is normal.

6. The die head of claim 1 wherein each of said chasers is integrally formed as a single piece, and wherein said workpiece-engaging portion of said each of said chasers comprises a thread-cutting element.

7. A thread-cutting system, comprising:

a fast-acting die head constructed for engagement of a workpiece on an axis thereof, said die head comprising a body constructed to receive a workpiece inserted axially at least partially thereinto; a plurality of chasers assembled with said body for movement, in effective opposition to one another, between closed and open positions in which said chasers are disposed relatively close to, and relatively distant from, said axis, respectively; biasing means operatively interposed between said body and said chasers for resiliently biasing said chasers toward said open position; and operating means assembled with said body and comprising a camming member reciprocally movable relative to said body along said axis, said camming member having at least one camming surface thereon for engagement with said chasers to force said chasers toward said closed positions and into engagement with a workpiece so inserted during movement of said camming member in one direction; said operating means also including an actuating member reciprocally movable relative to said camming member and constructed for engagement therewith to move said camming member in said one direction, and for movement independently thereof in the direction opposite to said one direction; each of said chasers having a workpiece-engaging portion comprised of thread-cutting elements, and at least two force-receiving elements, one of said force-receiving elements being a bearing surface for engagement by said biasing means to bias said chaser toward said open position, and the other of said force-receiving elements being a cam-follower surface disposed for engagement by said camming surface of said camming member to force said chaser toward said closed position, each of said chasers comprising an elongate member having a longitudinal axis and opposite end portions thereon, one of said end portions comprising said workpiece-engaging portion and the other of said end portions providing said at least two force-receiving elements, said elongate member having forward and rearward lengthwise margins and terminating at said other end portion in a forwardly inclined surface which provides a first portion of said cam-follower surface, said other end portion including a nose element that projects beyond said rearward margin and defines both said bearing surface and also a second portion of said cam-follower surface contiguous to said first portion thereof, said bearing surface and said second portion of said cam-follower surface being aligned generally on an axis parallel to said longitudinal axis of said elongate member; and actuating means, comprising an engagement component engaging said actuating member of said die head, a supporting component on which said engagement component is mounted, and limiting means, said supporting component being movable relative to said die head and being so constructed as to advance said die head to a position of initial engagement with a workpiece so received, acting through said engagement component and said actuating member, and to permit free movement of said engagement component beyond said position of initial engagement, said limiting means being so disposed as to engage said engagement component at a point beyond said position of initial engagement, and thereby to limit the distance that said engagement component can travel beyond said position of initial engagement; whereby, in operation of said system for cutting threads in a workpiece, said supporting component is moved relative to said die head so as to advance said die head to the position of initial engagement with the workpiece, whereby the thread cutting operation causes said die head and engagement component to advance together in said one direction until said engagement component engages said limiting means, and whereby continued advance of the components of said die head, other than said actuating member, causes said camming member to disengage said chasers to thereby permit said biasing means to bias said chasers toward said open position thereof.

8. The system of claim 7 wherein, in moving in effective opposition to one another, said chasers move in planes that include said axis.

9. The system of claim 8 wherein movement of said chasers is translational.

10. The system of claim 9 wherein said chasers move, and said biasing means acts, in planes to which said axis is normal, and wherein said at least one camming surface of said camming member, and said cam-follower surfaces of said chasers, lie generally oblique to said planes to which said axis is normal.

11. A chaser for a fast-acting die head, said chaser being integrally formed, as a single piece, and having a workpiece-engaging portion and at least two force-receiving elements, one of said force-receiving elements being a bearing surface for engagement by biasing means to bias said chaser in one direction, and the other of said force-receiving elements being a cam-follower surface disposed for engagement by a camming member to force said chaser in the direction opposite to said one direction, said chaser comprising an elongate member having a longitudinal axis and opposite end portions thereon, one of said end portions comprising said workpiece-engaging portion and the other of said end portions providing said at least two force-receiving elements, said elongate member having forward and rearward lengthwise margins and terminating at said other end portion in a forwardly inclined surface which provides a first portion of said cam-follower surface, said other end portion including a nose element that projects beyond said rearward margin and defines both said bearing surface and also a second portion of said cam-follower surface contiguous to said first portion thereof, said bearing surface and said second portion of said cam-follower surface being aligned generally on an axis parallel to said longitudinal axis of said elongate member.

12. The chaser of claim 11 wherein said workpiece engaging portion comprises a thread-cutting element.

* * * * *